(12) United States Patent
Kuhnke

(10) Patent No.: US 9,341,845 B2
(45) Date of Patent: May 17, 2016

(54) ANGLE MIRROR WITH IMAGE INJECTION

(71) Applicant: GUS PERISCOPES GMBH & CO. KG, Luebbecke (DE)

(72) Inventor: Dieter Kuhnke, Luebbecke (DE)

(73) Assignee: GuS Periscopes GmbH & Co. KG, Luebbecke (DE)

( * ) Notice: Subject to any disclaimer, the term of this patent is extended or adjusted under 35 U.S.C. 154(b) by 0 days.

(21) Appl. No.: 14/313,245

(22) Filed: Jun. 24, 2014

(65) Prior Publication Data

US 2014/0376099 A1    Dec. 25, 2014

(51) Int. Cl.
*G02B 27/14* (2006.01)
*G02B 27/01* (2006.01)
*G02B 17/08* (2006.01)
*G02B 23/08* (2006.01)

(52) U.S. Cl.
CPC .......... *G02B 27/0101* (2013.01); *G02B 17/086* (2013.01); *G02B 23/08* (2013.01); *G02B 2027/0127* (2013.01)

(58) Field of Classification Search
CPC ..................... G02B 17/086; G02B 2027/0127; G02B 23/08; G02B 27/0101
USPC .................................. 359/629–631, 633–634
See application file for complete search history.

(56) References Cited

U.S. PATENT DOCUMENTS

| 4,890,899 | A | * | 1/1990 | Aoki et al. ..................... 359/615 |
| 5,880,888 | A | | 3/1999 | Schoenmakers et al. |
| 5,982,536 | A | | 11/1999 | Swan et al. |
| 2001/0009478 | A1 | * | 7/2001 | Yamazaki et al. ............ 359/630 |
| 2001/0021068 | A1 | * | 9/2001 | Togino et al. ................. 359/630 |
| 2003/0129567 | A1 | | 7/2003 | Cabato et al. |
| 2010/0201676 | A1 | | 8/2010 | Minor et al. |
| 2011/0026090 | A1 | | 2/2011 | Minor et al. |
| 2012/0002294 | A1 | | 1/2012 | Dobschal et al. |

FOREIGN PATENT DOCUMENTS

| EP | 0225818 B1 | 4/1989 |
| WO | 2010102597 A1 | 9/2010 |

* cited by examiner

*Primary Examiner* — Thomas K Pham
*Assistant Examiner* — Vipin Patel
(74) *Attorney, Agent, or Firm* — Laurence A. Greenberg; Werner H. Stemer; Ralph E. Locher

(57) ABSTRACT

An angle mirror with image injection has an angle-mirror body, a viewing-in end, a viewing-out end, panels arranged in front of the ends, upper and lower deflection mirrors and a display. The image of the display is visible in the viewing-in end. The angle mirror makes it unnecessary for an observer's eye to refocus during an image-source change, such that he can recognize both represented image information items at the same time. This is achieved by arranging the display in a vertical direction on the angle mirror, configuring the lower deflection mirror as a beam splitter, arranging a first mirror element behind it, and guiding a first beam path of the display via an injection lens arranged on the angle-mirror body and likewise via mirror elements arranged thereon such that the first beam path is superposed at the beam splitter by a second beam path through the viewing-out end.

9 Claims, 2 Drawing Sheets

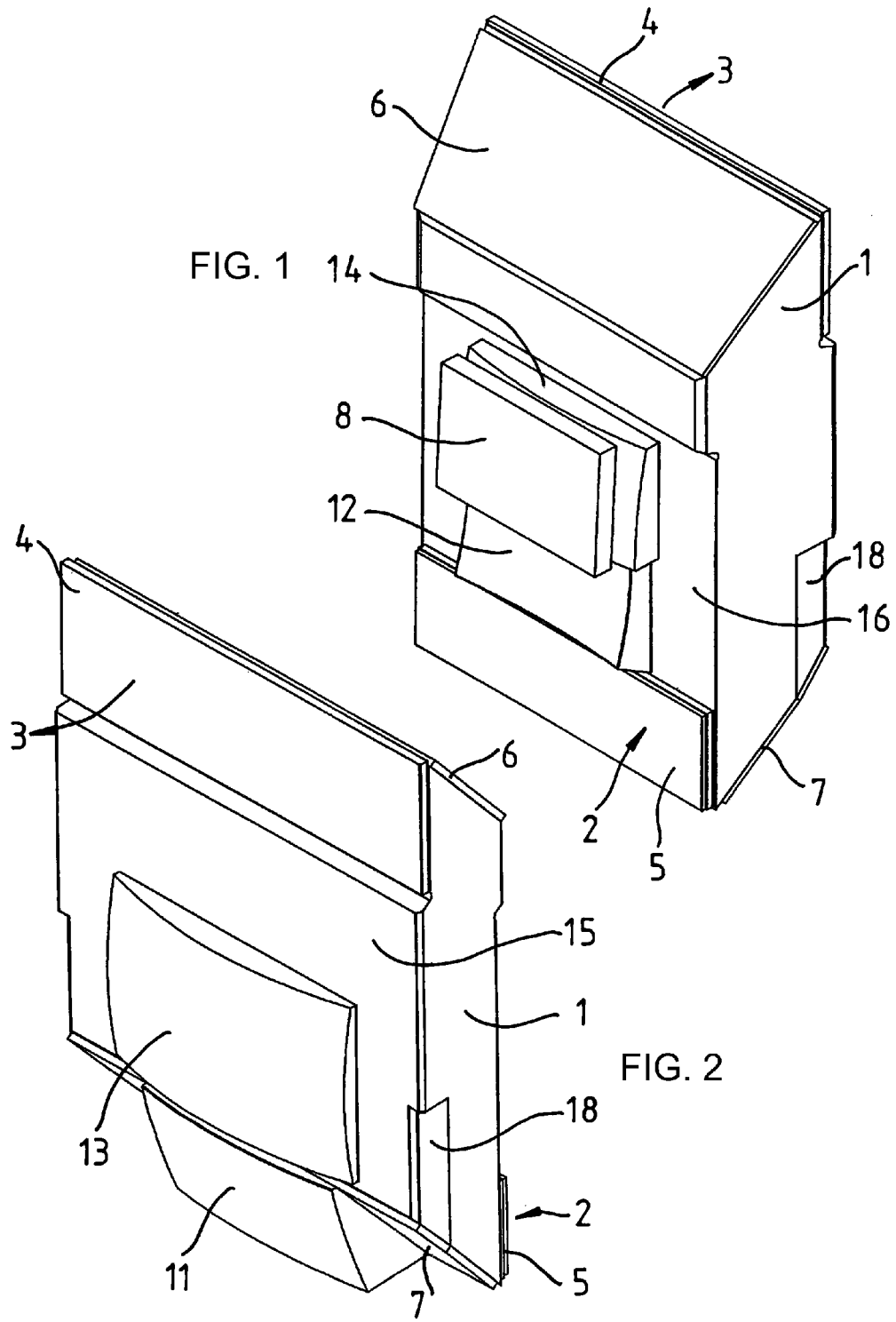

ANGLE MIRROR WITH IMAGE INJECTION

CROSS-REFERENCE TO RELATED APPLICATION

This application claims the priority, under 35 U.S.C. §119, of German application DE 10 2013 106 551.1, filed Jun. 24, 2013; the prior application is herewith incorporated by reference in its entirety.

BACKGROUND OF THE INVENTION

Field of the Invention

The invention relates to an angle mirror with image injection and having an angle-mirror body, a viewing-in end, a viewing-out end, panels arranged in front of the ends, upper and lower deflection mirrors and a display. The generated image of the display is visible in the viewing-in end.

Non-prosecuted, published German patent application DE 36 27 716 A1 discloses an angle-mirror arrangement which has, on the side opposite the viewing-in end of an angle-mirror body, a display unit which can be perceived, and which can be read from, by looking into the angle mirror.

A disadvantage of this previously known angle-mirror arrangement is in particular that an observer must refocus his eyes from infinite to the near range when proceeding from looking out of the viewing-out end to viewing the display unit, which is tiring in the long run, and at the same time the information cannot be acquired simultaneously by the observer.

SUMMARY OF THE INVENTION

It is the object of the invention to provide an angle mirror with image injection, which renders refocusing of the eyes of an observer when changing the image source unnecessary such that he can perceive both represented image information items at the same time.

Angle mirrors typically have a single-part or multipart angle-mirror body with a viewing-in end, a viewing-out end and in each case panels arranged in front of them, which have panel heating and/or optical filters. They also have upper and lower deflection mirrors, wherein it is well known for an electronic display to be arranged behind the viewing-in end such that it is visible directly or through a lower deflection mirror which is configured to be semi-transparent.

Since a display is arranged in a vertical direction on the angle mirror and the lower deflection mirror is likewise configured as a beam splitter, it is possible by arranging various mirror elements and an injection lens between the display and the angle-mirror body to implement a beam path which can be superposed by the beam path through the viewing-out end such that both image information items can be acquired with the same focusing of the eye of an observer at an identical distance from the viewing-in end, since the image of the display is generated as if located at infinite distance, such that the observer can continue to remain focused without accommodation of eyes, such that his eye lenses are directed at the far distance, as is the case with a typical viewing through the angle mirror.

Advantageous embodiments of the subject matter of the invention result from and in combination with the following dependent claims.

According to a particularly preferred embodiment of the invention, the display is placed on the side of the viewing-in end near the angle mirror, directly in front of the injection lens that is arranged on the angle-mirror body, such that only a small additional installation space is necessary for the display and the lens.

Arranged, in a manner such that they are arranged above one another with offset, opposite the first mirror element is the viewing-in end, directly there above a second mirror element, opposite which is, above the first mirror element, a third mirror element. Opposite the third mirror element, above the second mirror element, is the injection lens, without any substantial free spaces at least being kept between the panels of the viewing-in end of the second mirror element and the injection lens, such that this arrangement is also configured to be highly compact and space-saving.

The second mirror element and the third mirror element and also the injection lens are mounted on the front and rear side surfaces of the angle-mirror body, the mounting being effected preferably using a transparent bonding adhesive without air gaps, such that undesired refraction occurrences can be ruled out.

To this end, the angle-mirror body, the injection lens, the mirror elements and the transparent bonding adhesive advantageously have in each case an identical refractive index.

According to one preferred embodiment of the invention, only the first mirror element has a slight tilt with respect to the optical axis, and the second and third mirror elements and the injection lens are configured without tilt angle with respect to the optical axis, as a result of which the production outlay of the optical components can be significantly reduced.

The reduction is also due to the fact that the rear side surface of the angle-mirror body can be configured in one part as a vertical planar surface for arrangement of the panels of the viewing-in end, of the second mirror element and of the injection lens together.

The front side surface of the angle-mirror body preferably also has a vertical planar surface for arrangement of the third mirror element, with the vertical planar surface being configured to be parallel to the rear side surface on the side of the viewing-in end.

Other features which are considered as characteristic for the invention are set forth in the appended claims.

Although the invention is illustrated and described herein as embodied in an angle mirror with image injection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, perspective view of an angle mirror from a side of a viewing-in end according to the invention;

FIG. 2 is a perspective view of the angle mirror according to FIG. 1 from the side of a viewing-out end; and FIG. 3 is a side view of the angle mirror according to FIGS. 1 and 2 with a beam path drawn in.

DETAILED DESCRIPTION OF THE INVENTION

Figure 3:
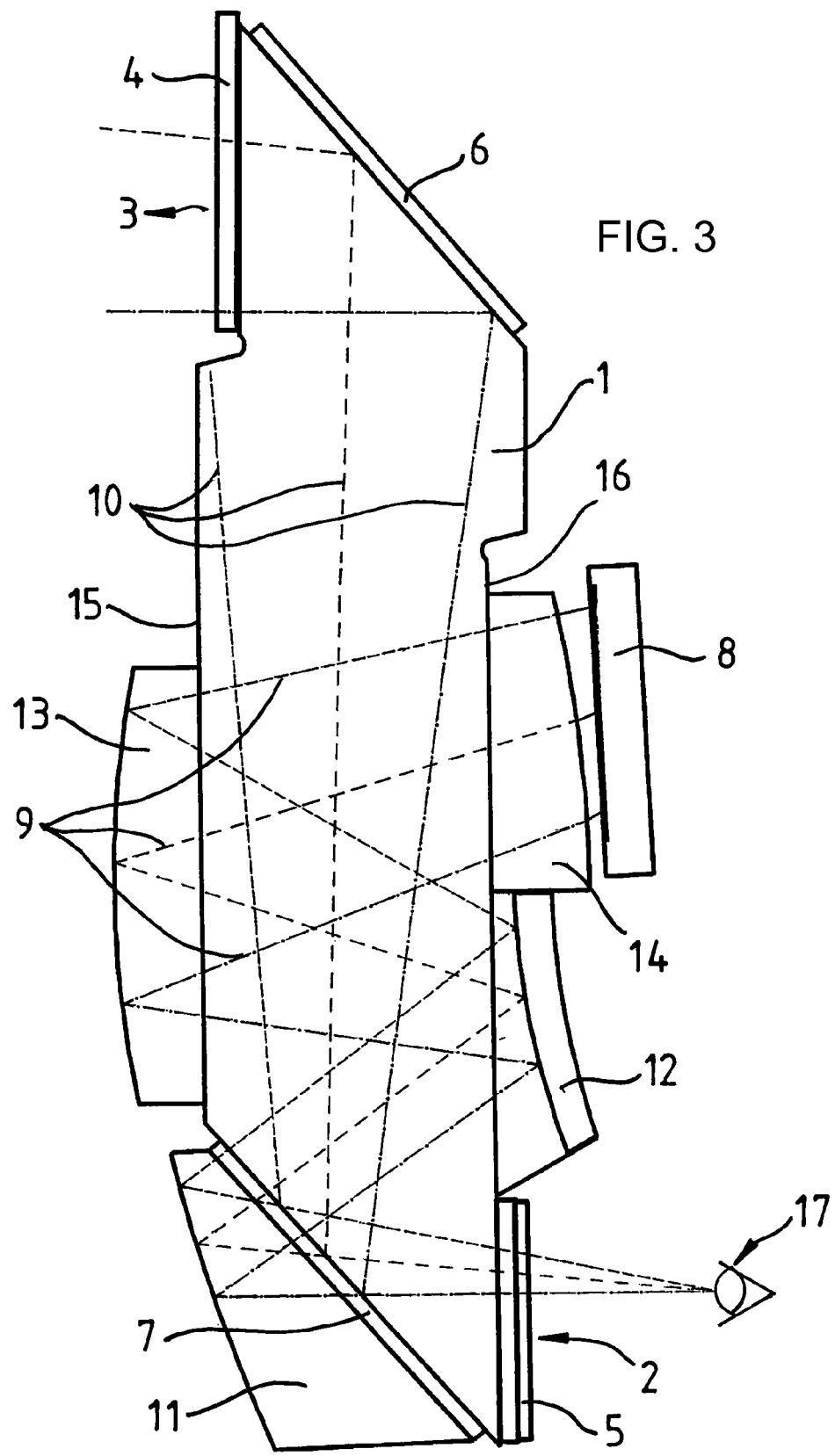

Referring now to the figures of the drawings in detail and first, particularly to FIG. 1 thereof, there is shown an angle mirror which contains an angle-mirror body 1 with a lower viewing-in end 2 and an upper viewing-out end 3, wherein panels 4; 5 which can have panel heating and/or filters are arranged in front of the ends 2, 3.

The inclined surfaces behind the viewing-in end 2 and the viewing-out end 3 are provided with an upper deflection mirror 6 and a lower deflection mirror, which is configured as a beam splitter 7.

A conventional beam path 10 enters through the viewing-out end 3, is deflected downward at the upper deflection mirror 6 and focused by the lower beam splitter 7 through the viewing-in end 2 onto an eye position 17 (see FIG. 3).

A vertical display 8 injects, using an injection lens 14 configured as a collector lens, the image with nearly parallel beam path 9 into the angle-mirror body 1. Wherein a third mirror element 13 is arranged on the opposite side of the angle-mirror body 1 such that it is offset obliquely downward, which third mirror element 13 is configured to be slightly concave and reflects the beam path 9 to a second mirror element 12, which is arranged directly under the injection lens 14 and for its part is configured to be slightly convex and reflects the beams obliquely downward onto a first mirror element 11. The first mirror element 11 is arranged behind the beam splitter 7 and is configured to be also slightly concave and reflects the beams such that, after passage through the beam splitter 7, they coincide with the beam path 10 and are likewise focused onto the eye position 17.

This makes it possible for an observer to observe both representations at the same time, without the need to refocus his eyes when he wishes to change over from the image of the viewing-out end 3 to the representation of the display 8 as the information source.

The lateral, approximately vertical lower corners of the angle-mirror body 1, which are located opposite the viewing-in end 2, to the sides of the third mirror element 13 are provided with inclined regions 18 so as to avoid undesired reflections.

The invention claimed is:

1. An angle mirror with image injection, the angle mirror comprising:
    an angle-mirror body;
    ends including a viewing-in end and a viewing-out end disposed in a vertical direction one above the other;
    panels disposed in front of said ends;
    upper and lower deflection mirrors, said lower deflection mirror being a beam splitter;
    a display disposed vertically between said viewing-in end and said viewing-out end, a generated image of said display being visible in said viewing-in end, said display disposed in a vertical direction on said angle mirror body;
    mirror elements including a first mirror element disposed behind said lower deflection mirror and a second mirror element; and
    an injection lens disposed on said angle-mirror body, and in that a first beam path of said display is guided via said injection lens and likewise via said mirror elements disposed on said angle-mirror body such that the first beam path is superposed at said beam splitter by a second beam path through said viewing-out end and both image information items are represented with a same focusing of an eye of an observer at an identical distance from said viewing-in end.

2. The angle mirror according to claim 1, wherein said display is disposed on a side of said viewing-in end on the angle mirror.

3. The angle mirror according to claim 1, wherein said mirror elements include a third mirror element, and in that disposed, in a manner such that said mirror elements are disposed above one another with offset, opposite said first mirror element above said viewing-in end is said second mirror element, opposite said second mirror element is, above said first mirror element, said third mirror element and, opposite said third mirror element, above said second mirror element, is said injection lens.

4. The angle mirror according to claim 3, wherein said second mirror element, said third mirror element and said injection lens are mounted on front and rear side surfaces of said angle-mirror body.

5. The angle mirror according to claim 1, further comprising a transparent bonding adhesive, said angle-mirror body, said injection lens, said mirror elements and said transparent bonding adhesive have in each case an identical refractive index.

6. The angle mirror according to claim 1, wherein said first mirror element is slightly tilted with respect to an optical axis.

7. The angle mirror according to claim 3, wherein said second mirror element, said third mirror element and said injection lens are configured without tilt angle with respect to an optical axis.

8. The angle mirror according to claim 1, wherein said angle-mirror body has a rear side surface with a common vertical planar surface for arrangement of said panel of said viewing-in end, said second mirror element and said injection lens.

9. The angle mirror according to claim 3, wherein said angle-mirror body has a rear side surface and a front side surface with a vertical planar surface for arrangement of said third mirror element configured to be parallel to said rear side surface on a side of said viewing-in end.

* * * * *